United States Patent
Yamashita et al.

(10) Patent No.: US 11,927,240 B2
(45) Date of Patent: Mar. 12, 2024

(54) ROTARY DAMPER AND MANUFACTURING METHOD THEREOF

(71) Applicant: SOMIC MANAGEMENT HOLDINGS INC., Tokyo (JP)

(72) Inventors: Masato Yamashita, Hamamatsu (JP); Keigo Ozaki, Brewer, ME (US)

(73) Assignee: SOMIC MANAGEMENT HOLDINGS INC., Tokyo (JP)

(*) Notice: Subject to any disclaimer, the term of this patent is extended or adjusted under 35 U.S.C. 154(b) by 0 days.

(21) Appl. No.: 17/793,609

(22) PCT Filed: Dec. 14, 2020

(86) PCT No.: PCT/JP2020/046456
§ 371 (c)(1),
(2) Date: Jul. 18, 2022

(87) PCT Pub. No.: WO2021/149394
PCT Pub. Date: Jul. 29, 2021

(65) Prior Publication Data
US 2023/0062021 A1 Mar. 2, 2023

(30) Foreign Application Priority Data

Jan. 20, 2020 (JP) .................. 2020-006945

(51) Int. Cl.
*F16F 9/14* (2006.01)
*F16F 9/12* (2006.01)

(52) U.S. Cl.
CPC ............. *F16F 9/145* (2013.01); *F16F 9/12* (2013.01)

(58) Field of Classification Search
CPC ................ F16F 9/145; F16F 9/12
See application file for complete search history.

(56) References Cited

U.S. PATENT DOCUMENTS

| 5,301,775 | A  | * | 4/1994  | Nedbal   | F16F 9/12  |
|           |    |   |         |          | 188/290    |
| 7,275,626 | B2 | * | 10/2007 | Fukuzawa | A47K 13/12 |
|           |    |   |         |          | 16/54      |
| 11,603,899| B2 | * | 3/2023  | Simura   | F16F 9/145 |
| 2006/0011427| A1 | * | 1/2006 | Fukuzawa | F16F 9/145 |
|           |    |   |         |          | 188/290    |

FOREIGN PATENT DOCUMENTS

| CN | 107110270   | 8/2017  |
| JP | 7-27163     | 1/1995  |
| JP | 2002-266922 | 9/2002  |
| JP | 2004-17824  | 1/2004  |
| JP | 2006-300088 | 11/2006 |
| JP | 2008-215606 | 9/2008  |
| JP | 2016-90037  | 5/2016  |
| KR | 20110032953 | 3/2011  |

OTHER PUBLICATIONS

Office Action dated Jul. 27, 2023 issued Chinese Patent Application No. 202080093710.7.

* cited by examiner

*Primary Examiner* — Thomas W Irvin
(74) *Attorney, Agent, or Firm* — Cozen O'Connor

(57) ABSTRACT

A rotary damper includes a lid (130) that closes an opening of a case (110), a protrusion (131) formed on the lid (130), and a groove (114) having an arc shape formed on the case (110). A bottom surface of the groove (114) has a gradient. The protrusion (131) moves in the groove (114) while contacting the bottom surface of the groove (114), thereby displacing the lid (130).

10 Claims, 9 Drawing Sheets

ROTARY DAMPER AND MANUFACTURING METHOD THEREOF

RELATED APPLICATIONS

This is a U.S. National Phase Application under 35 USC 371 of International Application PCT/JP2020/046456 filed on Dec. 14, 2020. This application claims the priority of Japanese application no. 2020-006945 filed Jan. 20, 2020, the entire content of which is hereby incorporated by reference.

TECHNICAL FIELD

The present invention relates to a method for manufacturing a rotary damper including a lid that closes an opening of a case, and a rotary damper suitable for the method of manufacturing the rotary damper.

BACKGROUND ART

The rotary damper includes a combination of a plurality of components, for example, a case, a lid, a rotor, and the like. However, since tolerances are indicated in the design drawing of each component, even when each component is manufactured according to the design drawing, variations in dimensions occur in each component not a little in the case of mass production. Variations in dimensions of each component affect the characteristics of the finished product, and thus it has been difficult to obtain uniform characteristics. In addition, it is difficult to make the viscosity of oil uniform in all mass-produced products. Variations in viscosity also affect the characteristics of the finished product, and thus it has been difficult to obtain uniform characteristics. Therefore, a tolerance range of the characteristics has to be designed to be wide.

CITATION LIST

Patent Literature

Patent Literature 1: JP 2004-17824 A

SUMMARY OF INVENTION

The present invention has been made in view of the above circumstances, and an object is to obtain more uniform characteristics.

Solution to Problem

In order to achieve the above object, the present invention provides a method for manufacturing a rotary damper including a lid configured to close an opening of a case, the method including: placing the lid on the case so as to close the opening with the lid; measuring characteristics of the rotary damper in a state where pressure is applied to the lid in a vertical direction; fixing the lid without displacing the lid when a measurement result satisfies a set value; and displacing the lid and measuring the characteristics of the rotary damper again in a state where the pressure is applied to the lid in the vertical direction when the measurement result does not satisfy the set value.

In addition, the present invention provides a rotary damper including: a lid configured to close an opening of a case; a protrusion configured to be formed on one of the lid and the case; and a groove having an arc shape formed on the other of the lid and the case, in which a bottom surface of the groove has a gradient, and the protrusion can displace the lid by moving in the groove while being in contact with the bottom surface of the groove.

Moreover, the present invention provides a rotary damper including: a lid configured to close an opening of a case; a protrusion configured to be formed on one of the lid and the case; a recess formed on the other of the lid and the case; and a small protrusion formed in the recess, in which the protrusion is fitted in the recess and supported by the small protrusion, and the protrusion can displace the lid by crushing the small protrusion.

Advantageous Effects of Invention

With the manufacturing method of the present invention, the lid is placed on the case to close the opening of the case with the lid, and the characteristics of the rotary damper are measured in a state where the pressure is applied to the lid in the vertical direction, so that the characteristics at the time of completion can be known before completion as a product. In addition, when the measurement result satisfies the set value, the lid is fixed without being displaced, so that a finished product having substantially the same characteristics as the measurement result can be obtained. In addition, when the measurement result does not satisfy the set value, the characteristics of the rotary damper are measured again in a state where the lid is displaced and the pressure is applied to the lid in the vertical direction, so that the characteristics can be changed so that the measurement value becomes the set value. Therefore, even when there is a variation in dimensions of each component and/or viscosity of oil, more uniform characteristics can be obtained. In addition, the tolerance width of the characteristics can be made much narrower than the conventional design.

With the rotary damper of the present invention, the bottom surface of the groove having an arc shape has a gradient, and the lid can be displaced by moving the protrusion in the groove while contacting the bottom surface of the groove, and thus the position of the lid can be changed by rotating the lid or the case. In addition, since the bottom surface of the groove is an inclined surface, the position of the lid can be finely adjusted. In addition, since the protrusion can move in both directions in the groove, the position of the lid can be raised as well as lowered from the initial position. Moreover, since the protrusion is in contact with the bottom surface of the groove, the lid can be stabilized in the same manner as at the time of completion by applying the pressure to the lid in the vertical direction, and therefore the characteristics can be accurately measured.

With the rotary damper of the present invention, since the lid can be displaced as the protrusion crushes the small protrusion, the position of the lid can be changed by applying the pressure in the vertical direction to the lid so that the protrusion collapses the small protrusion. In addition, since the position of the lid is determined by the extent that the protrusion crushes the small protrusion, the position of the lid can be finely adjusted. Moreover, since the protrusion is fitted to the recess and supported by the small protrusion, the lid can be stabilized in the same manner as at the time of completion by applying the pressure to the lid in the vertical direction, and therefore the characteristics can be accurately measured.

DESCRIPTION OF EMBODIMENTS

Figure 1:
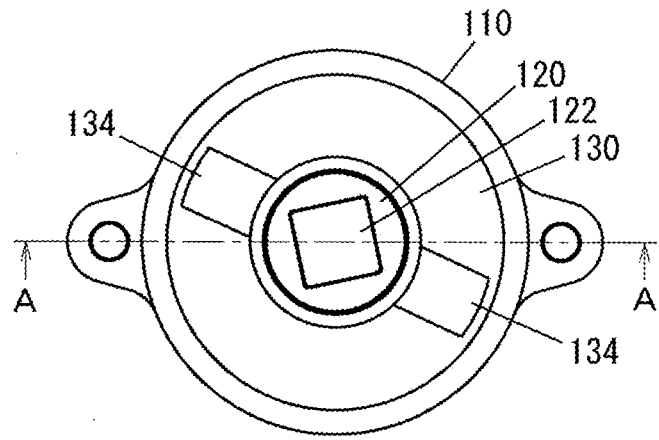
FIG. 1 is a plan diagram of a rotary damper according to a first example.

Hereinafter, an embodiment of the present invention will be described according to examples illustrated in the drawings.

First Example

Figure 2:
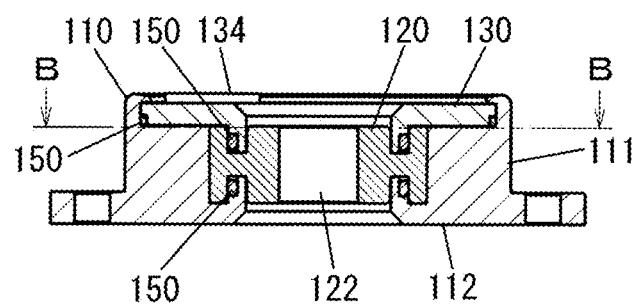
FIG. 2 is a cross-sectional diagram taken along line A-A of FIG. 1.
Figure 3:
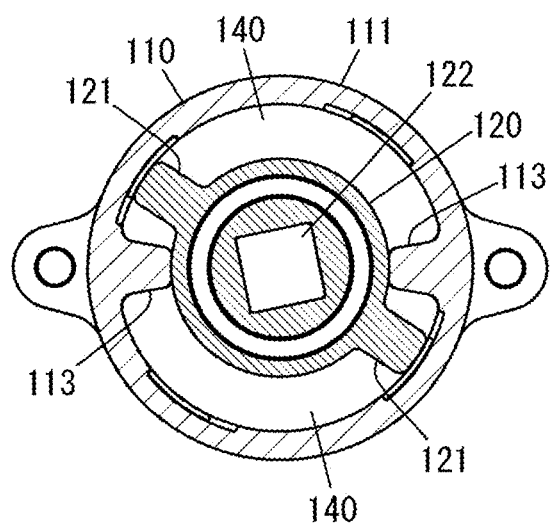
FIG. 3 is a cross-sectional diagram taken along line B-B of FIG. 2.

First, a structure of a rotary damper according to the first example will be schematically described with reference to FIGS. 1 to 3. As illustrated in FIG. 1, the rotary damper according to the first example includes a case 110, a rotor 120, and a lid 130. As illustrated in FIG. 3, the case 110 has a peripheral wall 111 having a cylindrical shape. As illustrated in FIG. 2, one end of the peripheral wall 111 is closed by a bottom wall 112 integrally molded with the peripheral wall 111, and the other end of the peripheral wall 111 is closed by the lid 130. The lid 130 is fixed by swaging an end portion of the case 110. The rotor 120 is housed in the case 110 and supported by the case 110 and the lid 130. As illustrated in FIG. 3, oil chambers 140 partitioned by partition walls 113 are formed between the case 110 and the rotor 120, and the oil chambers 140 are filled with oil. The rotor 120 includes vanes 121 disposed in the oil chambers 140. As illustrated in FIG. 2, O-rings 150 for preventing oil leakage are disposed between the case 110 and the lid 130, between the lid 130 and the rotor 120, and between the rotor 120 and the case 110. The rotary damper according to the first example decelerates the rotational speed of the rotor 120 using the resistance of oil received by the vanes 121 by the rotation of the rotor 120.

Figure 4:
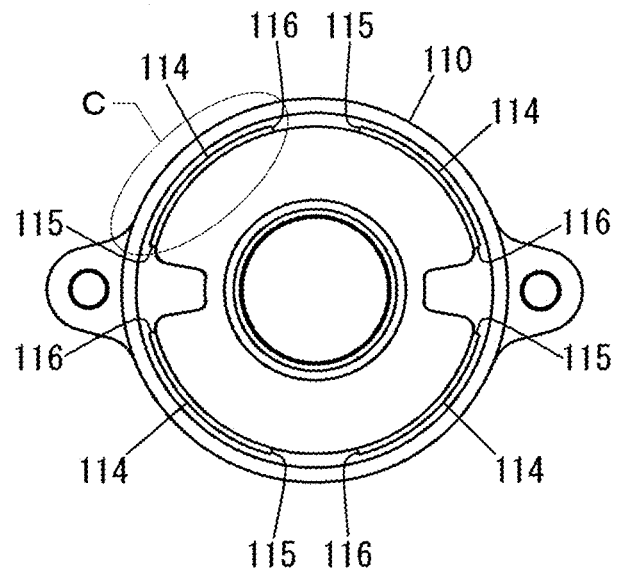
FIG. 4 is a plan diagram of a case adopted in the first example.
Figure 5:
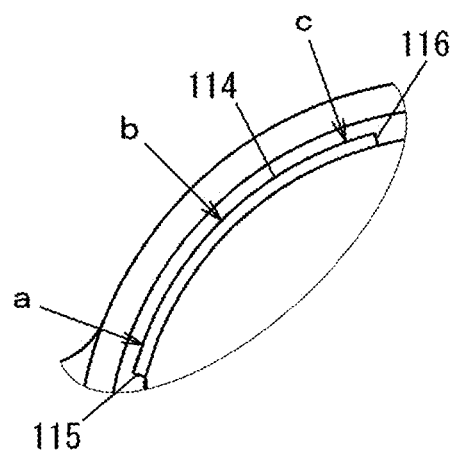
FIG. 5 is an enlarged diagram of a portion C of FIG. 4.
Figure 6:
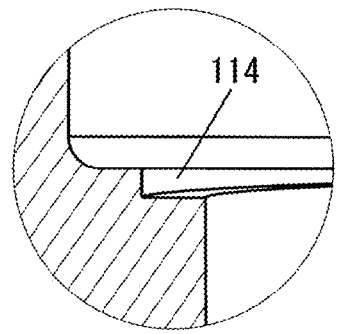
FIG. 6 is a cross-sectional diagram of a point a of FIG. 5.
Figure 7:
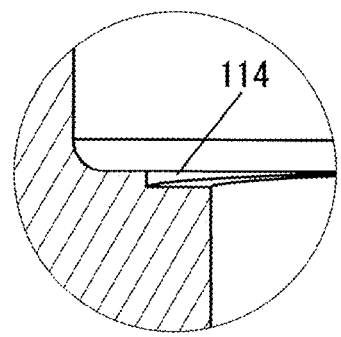
FIG. 7 is a cross-sectional diagram of a point b of FIG. 5.
Figure 8:
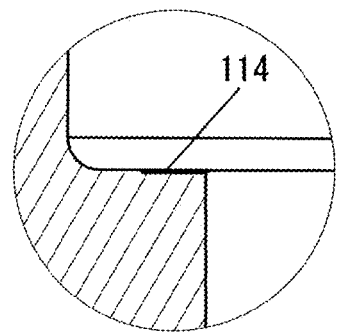
FIG. 8 is a cross-sectional diagram of a point c of FIG. 5.

Next, a feature of the case 110 adopted in the first example will be described with reference to FIGS. 4 to 8. As illustrated in FIG. 4, the case 110 adopted in the first example has grooves 114 having an arc shape. In order to horizontally support the lid 130, preferably, two or more grooves 114 are formed, and more preferably, three or more grooves 114 are formed. In the first example, four grooves 114 are formed at equal intervals. As illustrated in FIGS. 5 to 8, the grooves 114 have an L-shape in cross-section. The bottom surface of the groove 114 has a gradient that is inclined such that the depth of the groove 114 is shallowest at one end 115 of the groove 114 and deepest at the other end 116 of the groove 114. In FIG. 5, the depths of the groove 114 at a point a near the one end 115 of the groove 114, a point c near the other end 116 of the groove 114, and a point b intermediate between the points a and c are a>b>c.

Figure 9:
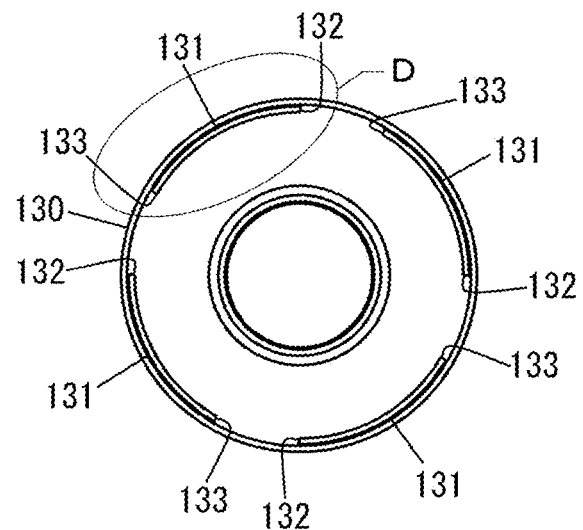
FIG. 9 is a bottom diagram of a lid adopted in the first example.
Figure 10:
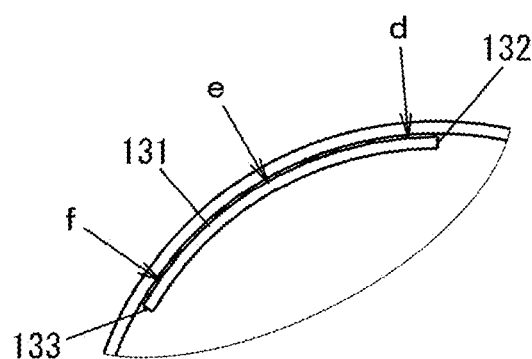
FIG. 10 is an enlarged diagram of a portion D of FIG. 9.
Figure 11:
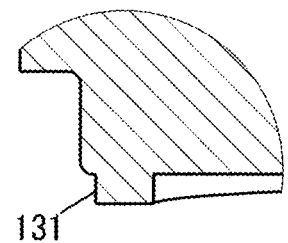
FIG. 11 is a cross-sectional diagram of a point d of FIG. 9.
Figure 12:
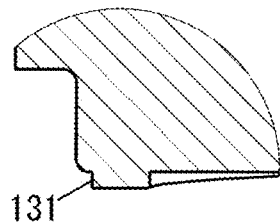
FIG. 12 is a cross-sectional diagram of a point e of FIG. 9.
Figure 13:
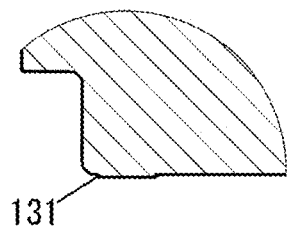
FIG. 13 is a cross-sectional diagram of a point f of FIG. 9.

Next, a feature of the lid 130 adopted in the first example will be described with reference to FIGS. 9 to 13. As illustrated in FIG. 9, the lid 130 adopted in the first example has the same number of protrusions 131 as the number of grooves 114 formed on the case 110. The shape of the protrusion 131 may be, for example, a cylinder, but is preferably the same shape as the groove 114, that is, an arc shape in order to increase the contact area between the tip surface of the protrusion 131 and the bottom surface of the groove 114. In the first example, four protrusions 131 having an arc shape are formed at equal intervals on the back surface of the lid 130. As illustrated in FIGS. 10 to 13, the tip surface of the protrusion 131 has a gradient that is inclined such that the length of the protrusion 131 is the longest at one end 132 of the protrusion 131 and the shortest at the other end 133 of the protrusion 131. In FIG. 10, the lengths of the protrusion 131 at a point d near the one end 132 of the protrusion 131, a point f near the other end 133 of the protrusion 131, and a point e intermediate between the points d and f are d>e>f. The gradient of the tip surface of the protrusion 131 is the same as the gradient of the bottom surface of the groove 114. Therefore, even when the protrusion 131 moves in the groove 114, the lid 130 is kept horizontal. Since the length of the protrusion 131 at the one end 132 of the protrusion 131 is longer than the depth of the groove 114 at the one end 115 of the groove 114, the protrusion 131 can move in the groove 114 between the one end 115 and the other end 116 of the groove 114 while bringing the tip surface into contact with the bottom surface of the groove 114.

Note that the rotary damper according to the first example has a structure including the lid 130 that closes the opening of the case 110, the protrusions 131 formed on the lid 130, and the grooves 114 having an arc shape formed on the case 110, but, alternatively, may have a structure including a lid that closes the opening of the case, protrusions formed on the case, and grooves having an arc shape formed on the lid.

Figure 14:
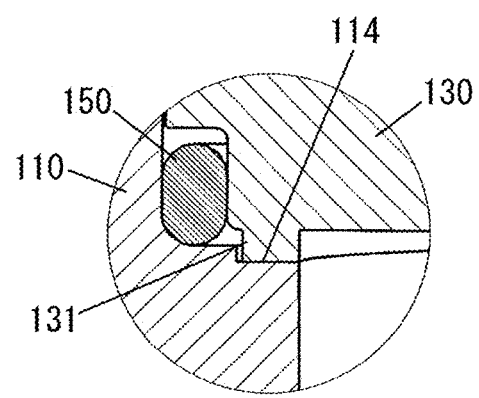
FIG. 14 is a cross-sectional diagram illustrating a fitting state of a protrusion and a groove at the point b of FIG. 5.

Next, an example of a method for manufacturing the rotary damper according to the first example will be described. In this example, first, the rotor 120 is housed in the case 110, and oil is loaded into the oil chambers 140. Next, the lid 130 is placed on the case 110 such that the lid 130 closes the opening (the other end of the peripheral wall 111) of the case 110, and the protrusions 131 are inserted into the grooves 114 (see FIG. 14). The initial position of the one end 132 of the protrusion 131 can be arbitrarily set. In this example, the one end 132 of the protrusion 131 is positioned at the center of the groove 114 (point b in FIG. 5), but the one end 132 of the protrusion 131 may be positioned near the one end 115 of the groove 114 (point a in FIG. 5) or near the other end 116 of the groove 114 (point c in FIG. 5).

Next, the characteristics of the rotary damper are measured in a state where the pressure is applied to the lid 130 in the vertical direction. With this method, it is possible to know characteristics at the time of completion in a state where the lid 130 is not fixed, that is, in a state of not being finished as a product. In order to more accurately measure the characteristics without displacing the lid 130 in a state where the lid 130 is not fixed, the magnitude of the pressure applied to the lid 130 is preferably a magnitude that can resist the internal pressure at the time of measurement. The characteristics to be measured may be arbitrarily set, but in this example, is the operating time of the rotor 120. For the operating time of the rotor 120, for example, a shaft is coupled to a through-hole 122 formed in the rotor 120, and a certain rotational force is applied to the shaft to rotate the rotor 120. Then, the time required for the shaft to rotate a certain angle (for example, 120°) at this time is measured. Note that the characteristics to be measured may be torque. For the torque, for example, a shaft is coupled to the through-hole 122 formed in the rotor 120, and a torque for rotating the shaft is measured. In the rotary damper according to the first example, since the protrusion 131 is in contact with the bottom surface of the groove 114, the lid 130 can be stabilized in the same manner as at the time of completion by applying the pressure to the lid 130 in the vertical direction, and therefore the characteristics can be accurately measured.

Figure 15:
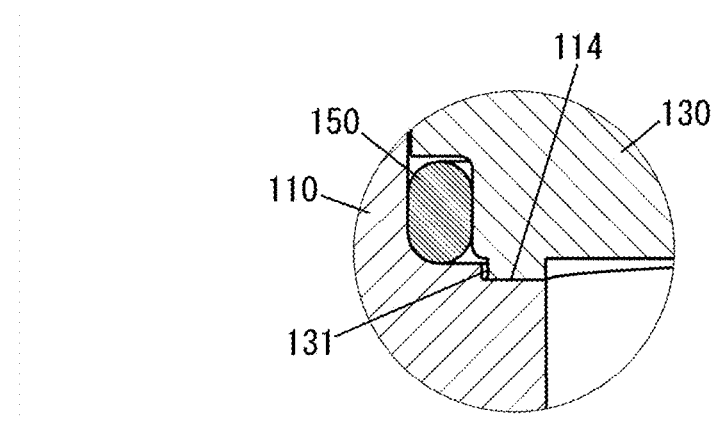
FIG. 15 is a cross-sectional diagram illustrating a fitting state of a protrusion and a groove at the point b of FIG. 5.

The measurement value may not be uniform due to variations in dimensions of each component and/or viscosity of the oil even when the lid 130 is placed at the same position and measurement is performed. When the measurement result does not satisfy a set value, the characteristics of the rotary damper are measured again in a state where the lid 130 is displaced and the pressure is applied to the lid 130 in the vertical direction. The set value includes a tolerance that is a difference between the maximum value and the minimum value of an allowable error of the characteristics. The displacement of the lid 130 is performed by rotating the lid 130 while bringing the protrusion 131 formed on the lid 130 into contact with the bottom surface of the groove 114 formed on the case 110. In this example, by rotating the lid 130 in one direction, the protrusion 131 moves in the groove 114 toward the other end 116 of the groove 114, so that the position of the lid 130 can be lowered (see FIG. 15). In addition, by rotating the lid 130 in the reverse direction, the protrusion 131 moves in the groove 114 toward the one end 115 of the groove 114, so that the position of the lid 130 can be raised. Note that the case 110 may be rotated without rotating the lid 130. In the rotary damper according to the first example, the lid 130 can be rotated using projections 134 formed on the surface of the lid 130 (see FIGS. 1 and 2). In order to displace the lid, a structure in which a step having a staircase shape is provided at the bottom of the groove can also be adopted as a structure different from that of the first example. In this case, the lid can be displaced by the movement of the protrusion along the step, but since the position of the lid is determined in stages, it is difficult to finely adjust the position of the lid. In this respect, in the rotary damper according to the first example, the bottom surface of the groove 114 is an inclined surface, and the lid 130 is displaced by the movement of the protrusion 131 along the inclined surface, so that the position of the lid 130 can be finely adjusted. In addition, since the protrusion 131 can move in both directions in the groove 114, the position of the lid 130 can be raised as well as lowered from the initial position. With this method, even when the initial measurement result does not satisfy the set value, the characteristics can be changed so that the measurement value becomes the set value, and, therefore, even when there is a variation in the dimension of each component and/or the viscosity of the oil, more uniform characteristics can be obtained. In addition, the tolerance width of the characteristics can be made much narrower than the conventional design. For example, the tolerance width of the characteristics can be ⅓ or less of the conventional design.

When the measurement result satisfies the set value, the lid 130 is fixed without displacing the lid 130 (that is, at the position of the lid 130 at the time of measurement). In the rotary damper according to the first example, the lid 130 is fixed by swaging the end portion of the case 110, but the lid 130 may be fixed by a method such as welding.

Second Example

Figure 16:
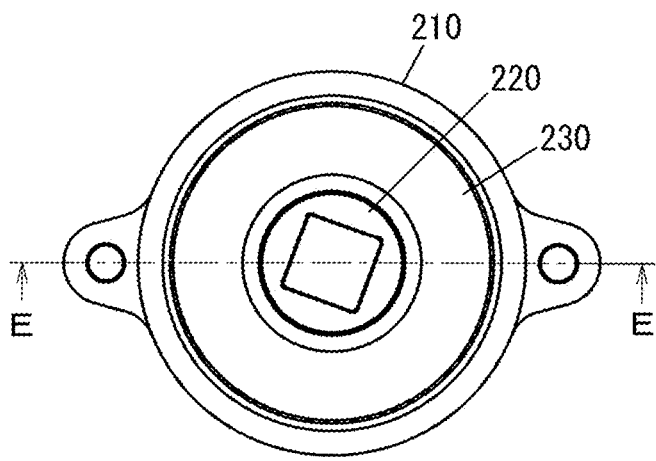
FIG. 16 is a plan diagram of a rotary damper according to a second example.
Figure 17:
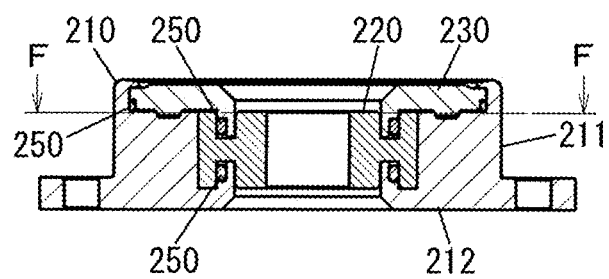
FIG. 17 is a cross-sectional diagram taken along line E-E of FIG. 15.
Figure 18:
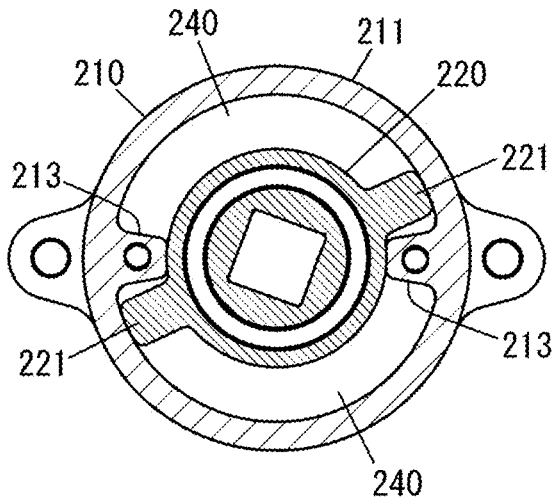
FIG. 18 is a cross-sectional diagram taken along line F-F of FIG. 16.

Next, a structure of a rotary damper according to the second example will be schematically described with reference to FIGS. 16 to 18. As illustrated in FIG. 16, the rotary damper according to the second example includes a case 210, a rotor 220, and a lid 230. As illustrated in FIG. 18, the case 210 has a peripheral wall 211 having a cylindrical shape. As illustrated in FIG. 17, one end of the peripheral wall 211 is closed by a bottom wall 212 integrally molded with the peripheral wall 211, and the other end of the peripheral wall 211 is closed by the lid 230. The lid 230 is fixed by swaging an end portion of the case 210. The rotor 220 is housed in the case 210 and supported by the case 210 and the lid 230. As illustrated in FIG. 18, oil chambers 240 partitioned by partition walls 213 are formed between the case 210 and the rotor 220, and the oil chambers 240 are filled with oil. The rotor 220 includes vanes 221 disposed in the oil chambers 240. As illustrated in FIG. 17, O-rings 250 for preventing oil leakage are disposed between the case 210 and the lid 230, between the lid 230 and the rotor 220, and between the rotor 220 and the case 210. The rotary damper according to the second example decelerates the rotational speed of the rotor 220 using the resistance of oil received by the vanes 221 by the rotation of the rotor 220.

Figure 19:
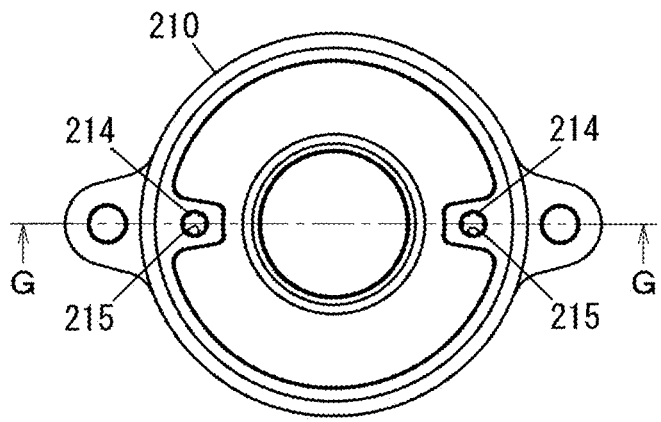
FIG. 19 is a plan diagram of a case adopted in the first example.
Figure 20:
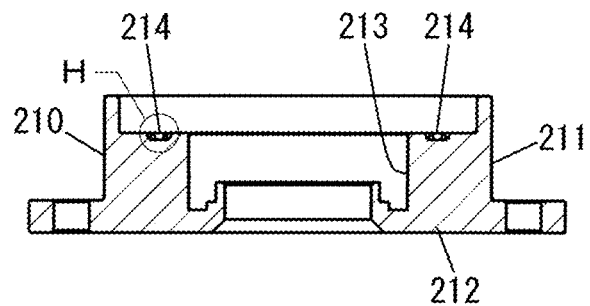
FIG. 20 is a cross-sectional diagram taken along line G-G of FIG. 18.
Figure 21:
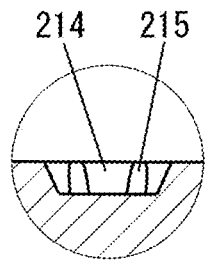
FIG. 21 is an enlarged diagram of a portion H of FIG. 19.

Next, a feature of the case 210 adopted in the second example will be described with reference to FIGS. 19 to 21. As illustrated in FIG. 19, the case 210 adopted in the second example has recesses 214 having a circular shape. In order to horizontally support the lid 230, preferably, two or more recesses 214 are formed. As illustrated in FIG. 20, in the second example, two recesses 214 are formed in the partition walls 213 integrally molded with the peripheral wall 211 and the bottom wall 212. As illustrated in FIG. 21, small protrusions 215 are formed in the recesses 214.

Figure 22:
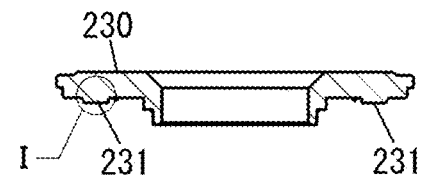
FIG. 22 is a cross-sectional diagram of a lid adopted in the second example.
Figure 23:
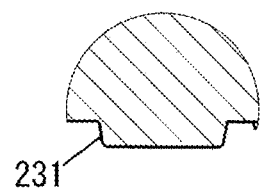
FIG. 23 is an enlarged diagram of a portion I of FIG. 21.

Next, a feature of the lid 230 adopted in the second example will be described with reference to FIGS. 22 to 23. As illustrated in FIG. 22, the lid 230 adopted in the second example has the same number of protrusions 231 as the number of recesses 214 formed in the case 210. In the second example, two protrusions 231 are formed on the back surface of the lid 230. The protrusion 231 illustrated in FIG. 23 can crush the small protrusions 215.

Note that the rotary damper according to the second example has a structure including the lid 230 that closes the opening of the case 210, the protrusions 231 formed on the lid 230, the recesses 214 formed on the case 210, and the small protrusions 215 formed in the recesses 214, but, alternatively, may have a structure including a lid that closes the opening of the case, protrusions formed on the case, recesses formed on the lid, and small protrusions formed in the recesses.

Figure 24:
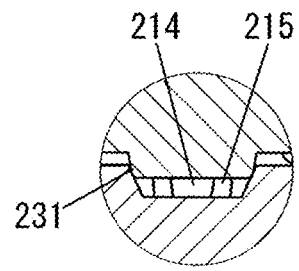
FIG. 24 is a cross-sectional diagram illustrating a fitting state of a protrusion and a recess.

Next, an example of a method for manufacturing the rotary damper according to the second example will be described. In this example, first, the rotor 220 is housed in the case 210, and oil is loaded into the oil chambers 240. Next, the lid 230 is placed on the case 210 such that the lid 230 closes the opening (the other end of the peripheral wall 211) of the case 210, and the protrusions 231 are fitted into the recesses 214 (see FIG. 24). The initial position of the tip of the protrusion 231 can be arbitrarily set. In this example, the tip of the protrusion 231 is disposed at a position where the small protrusions 215 are slightly crushed by the protrusion 231 (see FIG. 24).

Next, the characteristics of the rotary damper are measured in a state where the pressure is applied to the lid 230 in the vertical direction. With this method, it is possible to know characteristics at the time of completion in a state where the lid 230 is not fixed, that is, in a state of not being finished as a product. In order to more accurately measure the characteristics without displacing the position of the lid 230 in a state where the lid 230 is not fixed, the magnitude of the pressure applied to the lid 230 is preferably a magnitude that can resist the internal pressure at the time of measurement. The characteristics to be measured may be arbitrarily set, but in this example, is the operating time of the rotor 220. Note that the characteristics to be measured may be torque. In the rotary damper according to the second example, since the protrusion 231 is fitted to the recess 214 and supported by the small protrusions 215, the lid 230 can be stabilized in the same manner as at the time of completion by applying the pressure to the lid 230 in the vertical direction, and therefore the characteristics can be accurately measured.

Figure 25:
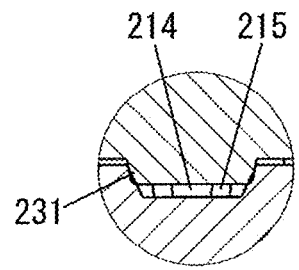
FIG. 25 is a cross-sectional diagram illustrating a fitting state of a protrusion and a recess.

The measurement value may not be uniform due to variations in dimensions of each component and/or viscosity of the oil even when the lid 230 is placed at the same position and measurement is performed. When the measurement result does not satisfy a set value, the characteristics of the rotary damper are measured again in a state where the lid 230 is displaced and the pressure is applied to the lid 230 in the vertical direction. The displacement of the lid 230 is performed by crushing the small protrusions 215 formed on the case 210 with the protrusion 231 formed on the lid 230. In this example, by applying the pressure in the vertical direction larger than that at the time of measurement to the lid 230, the protrusion 231 further crushes the small protrusions 215, so that the position of the lid 230 can be lowered (see FIG. 25). Since the position of the lid 230 is determined by the extent that the protrusion 231 crushes the small protrusions 215, the position of the lid 230 can be finely adjusted. With this method, even when the initial measurement result does not satisfy the set value, the characteristics can be changed so that the measurement value becomes the set value, and, therefore, even when there is a variation in the dimension of each component and/or the viscosity of the oil, more uniform characteristics can be obtained. In addition, the tolerance width of the characteristics can be made much narrower than the conventional design. For example, the tolerance width of the characteristics can be ⅓ or less of the conventional design.

When the measurement result satisfies the set value, the lid 230 is fixed without displacing the lid 230 (that is, at the position of the lid 230 at the time of measurement). In the rotary damper according to the second example, the lid 230 is fixed by swaging the end portion of the case 210, but the lid 230 may be fixed by a method such as welding.

REFERENCE SIGNS LIST

110 Case
111 Peripheral wall
112 Bottom wall
113 Partition wall
114 Groove
115 One end of groove
116 Other end of groove
120 Rotor
121 Vane
122 Through-hole
130 Lid
131 Protrusion
132 One end of protrusion
133 Other end of protrusion
134 Projection
140 Oil chamber
150 O-ring
210 Case
211 Peripheral wall
212 Bottom wall
213 Partition wall
214 Recess
215 Small protrusion
220 Rotor
221 Vane
230 Lid
231 Protrusion
240 Oil chamber
250 O-ring

The invention claimed is:

1. A method for manufacturing a rotary damper including a lid configured to close an opening of a case, the method comprising:
    placing the lid on the case so as to close the opening with the lid;
    applying a pressure to the lid in a vertical direction which is a direction orthogonal to an upper surface of the lid,
    measuring characteristics of the rotary damper in a state where the pressure is applied to the lid before the lid is fixed to the case;
    fixing the lid to the case without displacing the lid when a measurement result satisfies a set value; and
    displacing upward vertically or downward vertically the lid and then measuring the characteristics of the rotary damper again in a state where the pressure is applied to the lid in the vertical direction before the lid is fixed to the case when the measurement result does not satisfy the set value;
    wherein the rotary damper further includes a protrusion protruding in the vertical direction and formed on one of the lid and the case and a groove having an arc shape formed on the other of the lid and the case,
    wherein when the lid is placed on the case, the protrusion is brought into contact with a bottom surface having a gradient of the groove, and
    wherein the lid is displaced by rotating the lid or the case while bringing the protrusion into contact with the bottom surface of the groove.

2. The method according to claim 1, wherein the protrusion has an arc shape, and a tip surface of the protrusion has a same gradient as the bottom surface of the groove.

3. The method according to claim 1, wherein a magnitude of the pressure applied to the lid during measurement is a magnitude that can resist an internal pressure during measurement.

4. The method according to claim 1, wherein the characteristics are an operating time or torque of a rotor housed in the case.

5. A method for manufacturing a rotary damper including a lid configured to close an opening of a case, the method comprising:
placing the lid on the case so as to close the opening with the lid,
applying a pressure to the lid in a vertical direction which is a direction orthogonal to an upper surface of the lid,
measuring characteristics of the rotary damper in a state where the pressure is applied to the lid before the lid is fixed to the case,
fixing the lid to the case without displacing the lid when a measurement result satisfies a set value, and
displacing downward vertically the lid and then measuring the characteristics of the rotary damper again in a state where the pressure is applied to the lid in the vertical direction before the lid is fixed to the case when the measurement result does not satisfy the set value,
wherein the rotary damper further includes a protrusion formed on one of the lid and the case, a recess formed on the other of the lid and the case, and a small protrusion formed in the recess,
wherein when the lid is placed on the case, the protrusion is brought into contact with the small protrusion, and
wherein the lid is displaced by applying pressure to the lid in the vertical direction such that the protrusion collapses the small protrusion.

6. The method according to claim 5, wherein a magnitude of the pressure applied to the lid during measurement is a magnitude that can resist an internal pressure during measurement.

7. The method according to claim 5, wherein the characteristics are an operating time or torque of a rotor housed in the case.

8. A rotary damper comprising:
a lid configured to close an opening of a case;
a protrusion protruding in a vertical direction which is a direction orthogonal to an upper surface of the lid and formed on one of the lid and the case; and a groove having an arc shape formed on the other of the lid and the case, wherein a bottom surface of the groove has a gradient, and the protrusion can move in the groove while being in contact with the bottom surface of the groove to displace upward vertically and downward vertically the lid.

9. The rotary damper according to claim 8, wherein the protrusion has an arc shape, and a tip surface of the protrusion has a same gradient as the bottom surface of the groove.

10. A rotary damper comprising:
a lid configured to close an opening of a case;
a protrusion configured to be formed on one of the lid and the case;
a recess formed on the other of the lid and the case; and
a small protrusion formed in the recess,
wherein the protrusion is fitted in the recess and supported by the small protrusion, and the protrusion can crush the small protrusion directly to displace the lid in a downwardly vertical direction.

* * * * *